A. G. BURGESON.
BELT GUIDE.
APPLICATION FILED DEC. 11, 1913.
1,134,103.
Patented Apr. 6, 1915.
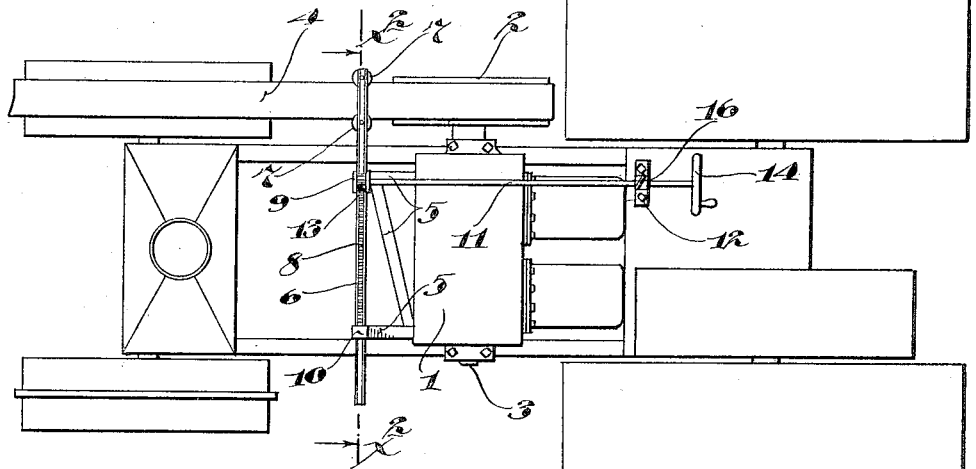
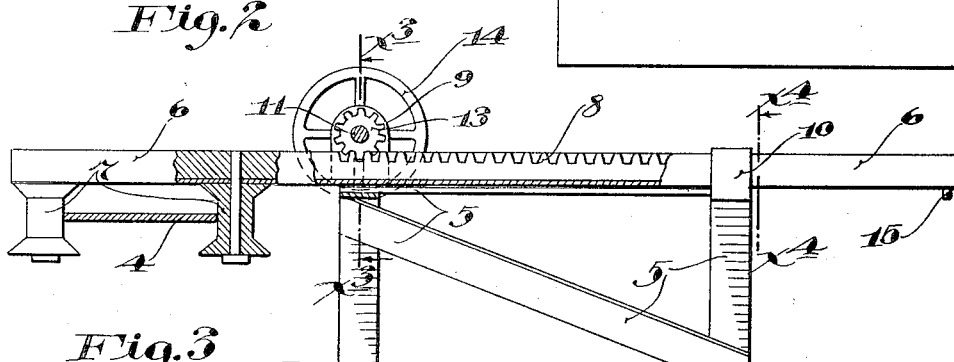
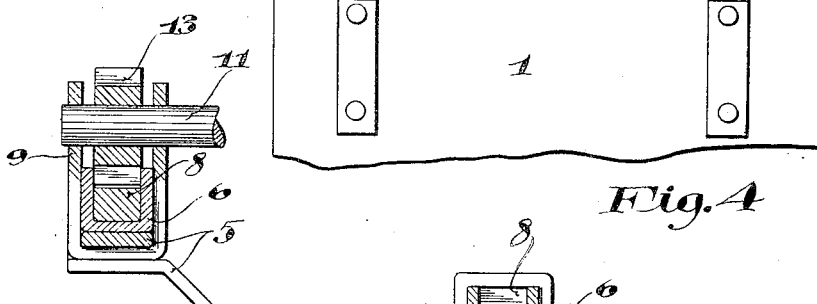
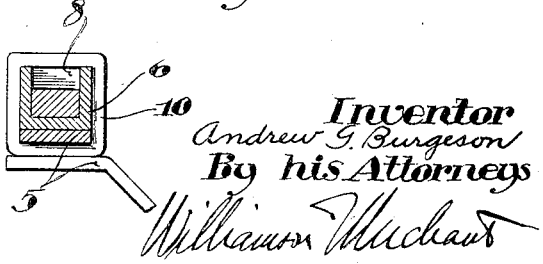
Witnesses
E. C. Skinkle
A. H. Opsahl
Inventor
Andrew G. Burgeson
By his Attorneys
Williamson Merchant

UNITED STATES PATENT OFFICE.

ANDREW G. BURGESON, OF DOUGLAS, NORTH DAKOTA.

BELT-GUIDE.

1,134,103.  Specification of Letters Patent.  Patented Apr. 6, 1915.

Application filed December 11, 1913. Serial No. 805,948.

*To all whom it may concern:*

Be it known that I, ANDREW G. BURGESON, a citizen of the United States, residing at Douglas, in the county of Ward and State of North Dakota, have invented certain new and useful Improvements in Belt-Guides; and I do hereby declare the following to be a full, clear, and exact description of the invention, such as will enable others skilled in the art to which it appertains to make and use the same.

My invention has for its object to provide an improved belt guide adapted for general use, but especially adapted for use in connection with traction engines; and, to the above ends, the invention consists of the novel devices and combinations of devices hereinafter described and defined in the claim.

In the accompanying drawings, which illustrate the invention, like characters indicate like parts throughout the several views.

Referring to the drawings:—Figure 1 is a plan view of a tractor, having applied thereto the improved belt guide; Fig. 2 is a view partly in transverse vertical section taken on the line $x^2$ $x^2$ on Fig. 1, and partly in elevation, on an enlarged scale; Fig. 3 is a detail view, principally in transverse vertical section taken on the line $x^3$ $x^3$ on Fig. 2; and Fig. 4 is a detail view, principally in transverse vertical section taken on the line $x^4$ $x^4$ on Fig. 2.

In the drawings, the improved belt guide is shown applied in working position to a standard Rumely oil pull tractor, and, for the purpose of this case, it is only necessary to note the engine crank shaft case 1, the driving pulley 2 on the engine shaft 3, and the belt 4, arranged to run over the pulley 2.

Referring to the improved belt guide, the numeral 5 indicates, as an entirety, a skeleton supporting bracket rigidly secured to the engine crank case 1. Slidably mounted on the horizontal portion of the supporting bracket 5, for endwise sliding movement transversely of the tractor, is a long horizontally extended belt guide roller supporting bar 6, preferably made, as shown, from a channel bar. This bar 6 is considerably longer than the bracket 5 and has loosely journaled on its outer end a pair of laterally depending flanged belt guide rollers 7. These rollers 7 are arranged to embrace the upper section of the belt 4, with the outer end of the bar 6 extending transversely thereabove, as best shown in Fig. 2.

Bolted or otherwise secured to the intermediate portion of the bar 6 is a long rack bar 8, located between the flanges thereof. The bar 6 is held for straight line endwise sliding movement transversely of the belt 4 by a pair of guides 9 and 10, located, respectively, at the inner and outer ends of the supporting bracket 5. The guide 9 is U-shaped, and the prongs thereof are perforated and extend above the rack bar 8, to afford bearings, the purpose of which will presently appear. The guide 10 is rectangular in form, and the rear end of the bar 6 slidably works therethrough.

The forward end of a long rearwardly extended shaft 11 is loosely journaled in the perforated prongs of the guide 9, and its rear end is journaled in a bearing 12, secured to a fixed part of the tractor. On the forward end of the shaft 11 is keyed, or otherwise secured, a pinion 13, which meshes with the rack 8, and on the rear end of said shaft is secured a hand wheel 14, provided for rotating the pinion 13, to thereby impart endwise sliding movement to the bar 6. A stop pin 15, on the rear end of the bar 6, is adapted to engage the guide 10, to limit the endwise sliding movement thereof toward the belt 4.

The hand wheel 14 is located within easy reach of the operator, and, by turning the same, the belt guide rollers 7 may be set to properly guide the belt 4 as it runs over the pulley 2. When it is desired to remove the belt from the pulley 2, the hand wheel 14 may be rotated in the proper direction, to force the inner roller 7 against the inner edge of the belt 4. Any suitable means may be provided for locking the pinion 9 against rotation, and thereby hold said bar against endwise sliding movement; and, in the drawings, is shown for this purpose a set screw 16. This set screw has screw-threaded engagement with the bearing 12, and its inner end is arranged to impinge against the shaft 1.

What I claim is:—

The combination with a supporting bracket, of front and rear guides on said bracket, said front guide being U-shaped, a rack bar mounted in said guides for endwise sliding movement, a shaft journaled in the side members of said U-shaped guide over said rack bar, a pinion on said shaft meshing with the teeth of said rack bar and holding the outer end of said rack bar against lifting movement, a hand wheel for rotating said shaft to impart endwise sliding movement to said rack bar, means for locking said pinion against rotation, and a pair of depending laterally-spaced belt guiding rollers loosely journaled on the free outer end of said rack bar.

In testimony whereof I affix my signature in presence of two witnesses.

ANDREW G. BURGESON.

Witnesses:
EMILY MAY KING,
H. D. KILGORE.

Copies of this patent may be obtained for five cents each, by addressing the "Commissioner of Patents, Washington, D. C."